US008545363B2

(12) United States Patent
Roehm et al.

(10) Patent No.: US 8,545,363 B2
(45) Date of Patent: Oct. 1, 2013

(54) SWITCHABLE PLANETARY GEAR SET IN A HANDHELD MACHINE TOOL

(75) Inventors: Heiko Roehm, Stuttgart (DE); Dietmar Saur, Gomaringen (DE)

(73) Assignee: Robert Bosch GmbH, Stuttgart (DE)

(*) Notice: Subject to any disclaimer, the term of this patent is extended or adjusted under 35 U.S.C. 154(b) by 16 days.

(21) Appl. No.: 13/129,695

(22) PCT Filed: Oct. 21, 2009

(86) PCT No.: PCT/EP2009/063776
§ 371 (c)(1),
(2), (4) Date: Jul. 28, 2011

(87) PCT Pub. No.: WO2010/054916
PCT Pub. Date: May 20, 2010

(65) Prior Publication Data

US 2011/0275471 A1 Nov. 10, 2011

(30) Foreign Application Priority Data

Nov. 17, 2008 (DE) ........................ 10 2008 043 795

(51) Int. Cl.
*F16H 3/44* (2006.01)
*B25F 5/00* (2006.01)

(52) U.S. Cl.
USPC ............................ 475/299; 475/317; 173/216

(58) Field of Classification Search
USPC ................................................ 475/299, 317
See application file for complete search history.

(56) References Cited

U.S. PATENT DOCUMENTS

| | | | | |
|---|---|---|---|---|
| 5,339,908 | A * | 8/1994 | Yokota et al. | 173/216 |
| 6,213,224 | B1 | 4/2001 | Furuta et al. | |
| 6,796,921 | B1 * | 9/2004 | Buck et al. | 475/299 |
| 2003/0171185 | A1 * | 9/2003 | Potter et al. | 475/298 |
| 2006/0068968 | A1 * | 3/2006 | Eisenhardt | 475/299 |
| 2006/0281596 | A1 * | 12/2006 | Milbourne et al. | 475/183 |
| 2007/0023196 | A1 * | 2/2007 | Hara et al. | 173/48 |
| 2007/0056759 | A1 | 3/2007 | Aeberhard | |
| 2011/0196375 | A1 * | 8/2011 | Li et al. | 606/80 |

FOREIGN PATENT DOCUMENTS

| | | |
|---|---|---|
| CN | 1370661 | 9/2002 |
| DE | 2 321 384 | 12/1973 |
| DE | 35 25 208 | 1/1986 |
| DE | 19900766 | 7/1999 |
| DE | 10 2004 058 809 | 6/2006 |
| DE | 10 2006 025 538 | 12/2007 |
| EP | 1190817 | 3/2002 |
| EP | 1364138 | 11/2003 |
| EP | 1 813 395 | 8/2007 |
| JP | 2002154062 | 5/2002 |
| WO | WO 02/058893 | 8/2002 |
| WO | WO 02/059500 | 8/2002 |

OTHER PUBLICATIONS

International Search Report for PCT/EP2009/063776, dated Jan. 18, 2010.

* cited by examiner

*Primary Examiner* — Sherry Estremsky
*Assistant Examiner* — Lillian Nguyen
(74) *Attorney, Agent, or Firm* — Kenyon & Kenyon LLP

(57) ABSTRACT

A switchable planetary gearbox in a hand-held power tool includes multiple planet carriers having associated planet wheels, and is to be displaced between at least two gear ratios, such that the gear ratios are to be engaged via a displaceable switching ring gear. At least three planet carriers having associated planet wheels are provided axially behind one another, such that in a position fixed with respect to the housing, the switching ring gear is rotationally coupled to the planet wheels on the second-stage planet carrier and simultaneously to the planet wheels on the third-stage planet carrier.

20 Claims, 1 Drawing Sheet

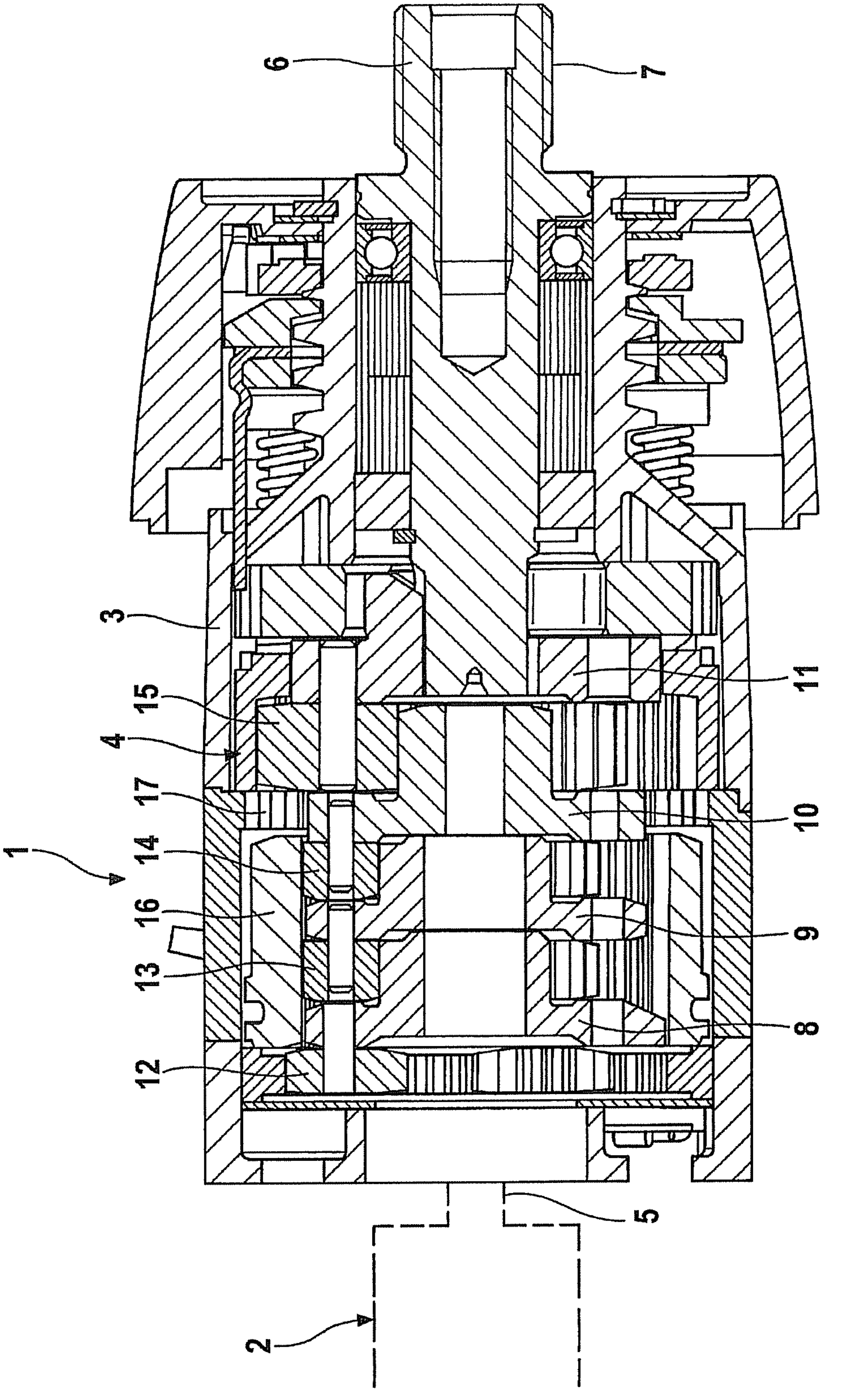
1
2
3
4
5
6
7
8
9
10
11
12
13
14
15
16
17

SWITCHABLE PLANETARY GEAR SET IN A HANDHELD MACHINE TOOL

FIELD OF THE INVENTION

The present invention relates to a switchable planetary gearbox in a hand-held power tool.

BACKGROUND INFORMATION

German Published Patent Application No. 10 2004 058 809 discloses a hand-held power tool, configured as a cordless screwdriver, that has as a drive unit an electric drive motor that drives, via a multi-stage planetary gearbox, a tool receptacle rotatably mounted in the housing for reception of a tool.

The planetary gearbox steps down the comparatively high motor rotation speed into a working spindle rotation speed range that is useful for the application. Planetary gearboxes of this kind are typically embodied with two gear ratios, which allow a selection between a slower rotational speed with high torque, and a higher rotational speed with lower torque. Switching between the gear ratios is accomplished with the aid of a slide switch that is displaced manually in an axial direction and thereby shifts a switching ring gear between a locked position fixed with respect to the housing and an unlocked position; in the unlocked position, the switching ring gear is rotationally connected to a first-stage planet carrier of the planetary gearbox, and circulates together with the planet carrier. In the locked position fixed with respect to the housing, on the other hand, the switching ring gear and the first-stage planet carrier are out of engagement, and at the same time the switching ring gear is rotationally coupled to planet wheels of a second-stage planet carrier.

SUMMARY

Example embodiments of the present invention provide a switchable planetary gearbox in a hand-held power tool, using simple design actions, so that a wide ratio spread can be attained.

According to example embodiments of the present invention, in a switchable planetary gearbox in a hand-held power tool, for example in a cordless screwdriver, the planetary gearbox includes, located axially one behind another, at least three planet carriers having associated planet wheels that, with the aid of an axially displaceable switching ring gear, are to be coupled in at least two different gear ratios. In a first gear ratio, the switching ring gear is rotationally coupled to a first-stage planet carrier, whereas in the second gear ratio the switching ring gear is interlocked fixedly with respect to the housing. In this position fixed with respect to the housing, the switching ring gear is rotationally coupled to the planet wheels on the second-stage planet carrier, and at the same time to the third-stage planet wheels.

Because at least two planetary stages, e.g. the second and the third planetary stage, are located inside the switching ring gear and are coupled thereto in the locked position, a wider ratio spread is possible as compared with embodiments from the existing art. In particular, a ratio spread greater than 5 can be achieved, so that the stepdown of the slow ratio is equal to at least five times the stepdown of the fast ratio. It is furthermore possible to select the stepdown of the slow ratio as a function of the motor design such that the no-load spindle rotation speed of the hand-held power tool is less than 100 rpm.

With this ratio spread, high torques are achieved in the slow ratio. A further advantage may be seen in the fact that the ratio spread can be implemented even if the planetary stage has a small diameter, and also that only relatively few components are necessary. In addition, the wide ratio spread allows the use of smaller or weaker drive motors. Lastly, the slower rotational speed in the smaller gear ratio also provides better control over the operating result, since the operating run-on between a stop actuation and the actual cessation of processing is reduced.

The gearbox stepdown or ratio spread can be defined by way of the design of the planet carriers, in particular the second- and third-stage planet carriers including the associated planet wheels. Suitable in this context are both identical planet carriers and planet wheels in the second and third stages, which has the advantage in particular that the switching ring gear can have, on the inner side, a uniform tooth set geometry for engaging with both the second-stage planet wheels and the third-stage planet wheels. Also possible, however, is a different design for the second and the third planetary stage, for example such that different diameters are provided; in this case the switching ring gear is in two parts, and has a different inside diameter in the two segments in order to enable engagement with the respective second- and third-stage planet wheels. In addition, it is also conceivable, whether the diameter is the same or different, for different tooth set geometries to be provided in the planet carriers and the associated planet wheels, and for a respectively corresponding tooth set geometry also to be configured accordingly on the inner side of the switching ring gear. Different stepdown ratios can be established by the tooth set geometries.

In an example embodiment of particularly simple design, the hollow-cylindrical switching ring gear is equipped on its inner side with a uniform locking contour or tooth set geometry, with which an interlocking engagement both with the adjacent planet carrier and with the second- and third-stage planet wheels is achievable. In this example embodiment, the planet carrier of the adjacent stage possesses the same outside diameter as the cylindrical enveloping curve around the second- and third-stage planet wheels.

The switching ring gear is to be displaced axially between the gear ratios. Provided for this purpose is an actuation element, projecting radially out of the housing, that is arranged as a slide switch, for example such that the slide switch engages into a groove extending circumferentially around the outer side of the switching ring gear, and that the switching ring gear is displaced axially between the switch positions upon a motion of the slide switch.

In the first gear ratio, in which the switching ring gear is in the unlocked position with reference to the housing and is rotationally coupled to the adjacent, for example first-stage, planet carrier, a coupling also exists between the switching ring gear and both the second-stage and the third-stage planet wheels. Because of the rotational retention between the adjacent planet carriers and the switching ring gear, the switching ring gear rotates relative to the housing at the same rotation speed as the planet carriers. The second and third stage are rendered inoperable because of the immobilization via the switching ring gear.

When, on the other hand, the switching ring gear is moved into the second gear ratio, in which the switching ring gear is interlocked fixedly with respect to the housing, the switching ring gear and the adjacent planet carrier are then out of engagement. At the same time, the second- and third-stage planet wheels can circulate along the inner contour of the switching ring gear.

A locking ring fixedly connected to the housing is provided in order to allow interlocking of the switching ring gear to be implemented. The switching ring gear and locking ring possess mutually corresponding locking elements that come into locking engagement when the switching ring gear is moved axially toward the locking ring, with the result that the switching ring gear assumes its locked position.

Further advantages and aspects of example embodiments are evident from the description of the FIGURE, and the drawing, showing a section in a longitudinal direction through a hand-held power tool in the region of a switchable gearbox that is arranged as a planetary gearbox, in which in order to switch between two gear ratios, a switching ring gear is to be axially displaced between a locked position fixed with respect to a housing, and an unlocked position.

DETAILED DESCRIPTION

Hand-held power tool 1, for example a cordless screwdriver, encompasses an electric drive motor 2, depicted only schematically, whose motor shaft is coupled to a planetary gearbox 4 in a gearbox housing 3 in order to drive a spindle 6 rotatably mounted in the gearbox housing. Gearbox housing 3 can, if applicable, be part of the motor housing. The exposed end face of spindle 6 is equipped with an external thread 7 for attaching a drill chuck into which a tool can be clamped.

Planetary gearbox 4 is embodied with four stages, and can be switched between two gear ratios in order to change the stepdown and torque ratio. Planetary gearbox 4 encompasses planet carriers 8, 9, 10, and 11, which form the first, second, third, and fourth stages respectively and with which planet wheels 12, 13, 14, and 15 of corresponding stages are associated. Planet carriers 8 to 11 are located coaxially with the longitudinal axis of motor shaft 5 and spindle 6.

In order to switch between the two gear ratios having different rotational speeds and a different torque ratio, a switching ring gear 16 is mounted axially shiftably in housing 3. Switching ring gear 16 is to be axially displaced between the unlocked position (as depicted) and a locked position fixed with respect to the housing, in which position switching ring gear 16 is in locking engagement with a locking ring 17 disposed fixedly with respect to the housing. The axial position of switching ring gear 16 as depicted, in which no locking engagement with locking ring 17 exists, represents the first gear ratio, with a high rotational speed and low torque for the spindle. In the locked position axially shifted with respect thereto and fixed with respect to the housing, in which a locking engagement exists between switching ring gear 16 and locking ring 17, the gearbox is in the second gear ratio with a low rotational speed and higher torque.

Switching ring gear 16 fits around first-stage planet carrier 8 and the respective second- and third-stage planet wheels 13 and 14, which are disposed on the respective corresponding second- and third-stage planet carriers 9 and 10. Switching ring gear 16 has on its inner side a locking contour in the form of a tooth set with which, in the first gear ratio (as depicted), switching ring gear 16 is nonrotatably coupled to first-stage planet carrier 8 so that switching ring gear 16 exerts, with respect to housing 3, the same rotary motion as planet carrier 8. At the same time, a coupling exists to second- and third-stage planet wheels 13 and 14, which are rendered inoperable via the immobilization with the switching ring gear, since the sun wheels of planet carriers 8 and 9 perform the same rotary motion as switching ring gear 16.

First-stage planet carrier 8 possesses the same outside diameter as an enveloping curve around second- and third-stage planet wheels 13 and 14. This makes it possible to provide a switching ring gear 16 of hollow-cylindrical configuration having a cylindrical inner periphery that is equipped with an axial locking contour or locking tooth set that remains constant over the axial length of the switching ring gear and that is in engagement with a corresponding gear set on planet carrier 8 and on planet wheels 13 and 14.

In order to transfer into the second gear ratio, switching ring gear 16 is displaced axially, out of the position depicted in which the switching ring gear is in the unlocked position with respect to locking ring 17, into an engagement position with the locking ring, so that switching ring gear 16 is in a locked position fixed with respect to the housing. In this locked position, there is no longer a rotational coupling between first-stage planet carrier 8 and switching ring gear 16. Instead, switching ring gear 16 is still in an engaged position with second- and third-stage planet wheels 13 and 14, but because switching ring gear 16 is locked fixedly with respect to the housing, they circulate along the inner side of the switching ring gear.

What is claimed is:

1. A switchable planetary gearbox in a hand-held power tool, comprising:

multiple planet carriers having associated planet wheels and displaceable between at least two gear ratios, such that the gear ratios are engageable via a displaceable switching ring gear and such that in a first gear ratio the switching ring gear is rotationally coupled to a planet carrier, and in a second gear ratio the switching ring gear is locked fixedly with respect to a housing;

wherein at least two planetary stages are located, axially behind one another, inside an axial length configured for rotational coupling of the switching ring gear.

2. The planetary gearbox according to claim 1, wherein an inner side of the switching ring gear is equipped with a locking contour adapted to interlock with a first-stage planet carrier and second- and third-stage planet wheels.

3. The planetary gearbox according to claim 2, wherein the locking contour of the switching ring gear adapted to interlock with the second-stage planet wheels is identical to the locking contour adapted to interlock with the third-stage planet wheels.

4. The planetary gearbox according to claim 2, wherein the locking contour of the switching ring gear adapted to interlock with the first-stage planet carrier is identical to the locking contour adapted to interlock with at least one of (a) the second- and (b) the third-stage planet wheels.

5. The planetary gearbox according to claim 1, wherein second- and third-stage planet carriers and associated planet wheels have the same stepdown ratio.

6. The planetary gearbox according to claim 1, wherein second- and third-stage planet carriers and associated planet wheels have different stepdown ratios.

7. The planetary gearbox according to claim 1, wherein in the first gear ratio, in which the switching ring gear is rotationally coupled to an adjacent planet carrier, a coupling of the switching ring gear to second- and third-stage planet wheels also exists.

8. The planetary gearbox according to claim 1, wherein in the first gear ratio, the switching ring gear is rotationally coupled to a first-stage planet carrier.

9. The planetary gearbox according to claim 1, wherein in the first gear ratio, the switching ring gear is rotationally coupled to a third-stage planet carrier.

10. The planetary gearbox according to claim 1, wherein a slide switch that projects out of the housing and is connected to the switching ring gear is provided in order to carry out an axial switching motion.

11. The planetary gearbox according to claim 1, wherein in a locked position fixed with respect to the housing, the switching ring gear is interlocked with a locking ring that is connected fixedly to the housing.

12. A hand-held power tool, comprising a planetary gearbox as recited in claim 1.

13. The planetary gearbox according to claim 1, wherein in the second gear ratio the switching ring gear is rotationally coupled to second-stage planet wheels and to third-stage planet wheels.

14. The planetary gearbox according to claim 1, wherein a stepdown of a slow ratio is equal to at least five times a stepdown of a fast ratio.

15. The planetary gearbox according to claim 1, wherein a stepdown of a slow ratio is configured such that a non-load spindle rotation speed is less than 100 rpm.

16. The planetary gearbox according to claim 1, wherein planet wheels and planet carriers of second and third stages are identical.

17. The planetary gearbox according to claim 1, wherein second and third planetary stages have different diameters.

18. The planetary gearbox according to claim 17, wherein the switching ring gear comprises two segments configured to engage second and third planet wheels.

19. A switchable planetary gearbox in a hand-held power tool, comprising:

multiple planet carriers having associated planet wheels and displaceable between at least two gear ratios, such that the gear ratios are engageable via a displaceable switching ring gear and such that in a first gear ratio the switching ring gear is rotationally coupled to a planet carrier, and in a second gear ratio the switching ring gear is locked fixedly with respect to a housing;

wherein at least two planetary stages are located, axially behind one another, inside the switching ring gear; and wherein a stepdown of a slow ratio is equal to at least five times a stepdown of a fast ratio.

20. A switchable planetary gearbox in a hand-held power tool, comprising:

multiple planet carriers having associated planet wheels and displaceable between at least two gear ratios, such that the gear ratios are engageable via a displaceable switching ring gear and such that in a first gear ratio the switching ring gear is rotationally coupled to a planet carrier, and in a second gear ratio the switching ring gear is locked fixedly with respect to a housing;

wherein at least two planetary stages are located, axially behind one another, inside the switching ring gear; and wherein a stepdown of a slow ratio is configured such that a non-load spindle rotation speed is less than 100 rpm.

* * * * *

UNITED STATES PATENT AND TRADEMARK OFFICE

CERTIFICATE OF CORRECTION

PATENT NO. : 8,545,363 B2
APPLICATION NO. : 13/129695
DATED : October 1, 2013
INVENTOR(S) : Roehm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 129 days.

Signed and Sealed this
Fifteenth Day of September, 2015

Michelle K. Lee
*Director of the United States Patent and Trademark Office*